United States Patent [19]

Allen et al.

[11] Patent Number: 4,575,817
[45] Date of Patent: Mar. 11, 1986

[54] SWITCHING OF PROGRAMMING ROUTINE SUPPORTING STORAGE STACKS

[75] Inventors: Wade H. Allen, Austin; Theodore M. Cory, Leander, both of Tex.; Patrick J. Hurley, Highland Beach, Fla.; Raymond A. Thornton, Austin, Tex.

[73] Assignee: International Business Machines Corporation, Armonk, N.Y.

[21] Appl. No.: 508,394

[22] Filed: Jun. 27, 1983

[51] Int. Cl.⁴ .......................... G06F 9/00; G06F 7/00; G06F 11/00
[52] U.S. Cl. .................................................. 364/900
[58] Field of Search ... 364/200 MS File, 900 MS File, 364/300

[56] References Cited

U.S. PATENT DOCUMENTS

| | | | |
|---|---|---|---|
| 3,878,513 | 4/1975 | Werner | 364/200 |
| 4,121,286 | 10/1978 | Venton et al. | 364/200 |
| 4,297,743 | 10/1981 | Appell et al. | 364/200 |
| 4,484,302 | 11/1984 | Cason et al. | 364/900 |

OTHER PUBLICATIONS

IBM Data Processing Glossary, 6th ed., Oct. 1977 published by IBM Corp., White Plains, New York.

Primary Examiner—James D. Thomas
Assistant Examiner—William G. Niessen
Attorney, Agent, or Firm—J. B. Kraft

[57] ABSTRACT

A system in which a device or machine is controlled by instructions from a data processor is provided which minimizes main memory storage requirements. An interrupt service routine monitors the input to the processor received from the device in response to control instructions sent by the processor. The interrupt service routine monitors this response for exception conditions. When an exception condition indicating that the device is no longer capable of fully carrying out processor instructions is received by the interrupt service routine, it activates an exception handler routine. A primary memory storage stack normally supports the interrupt service routine. However, upon the activation of the exception handler routine, this primary storage stack is switched to support the exception handler routine, and a secondary stack of significantly lower storage capacity is placed in support of the interrupt service routine which should have lower purported storage requirements during the active period of the exception handler routine. This results in a substantial saving of main processor memory capacity which otherwise would have to be dedicated to the support of the two respective routines.

10 Claims, 9 Drawing Figures

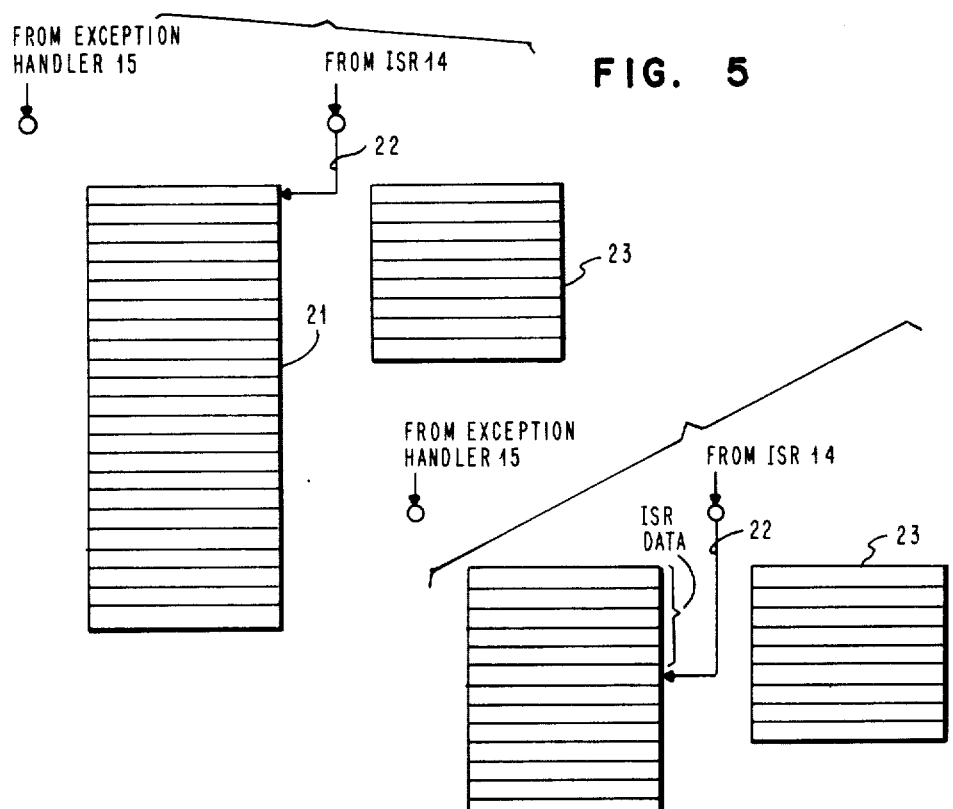
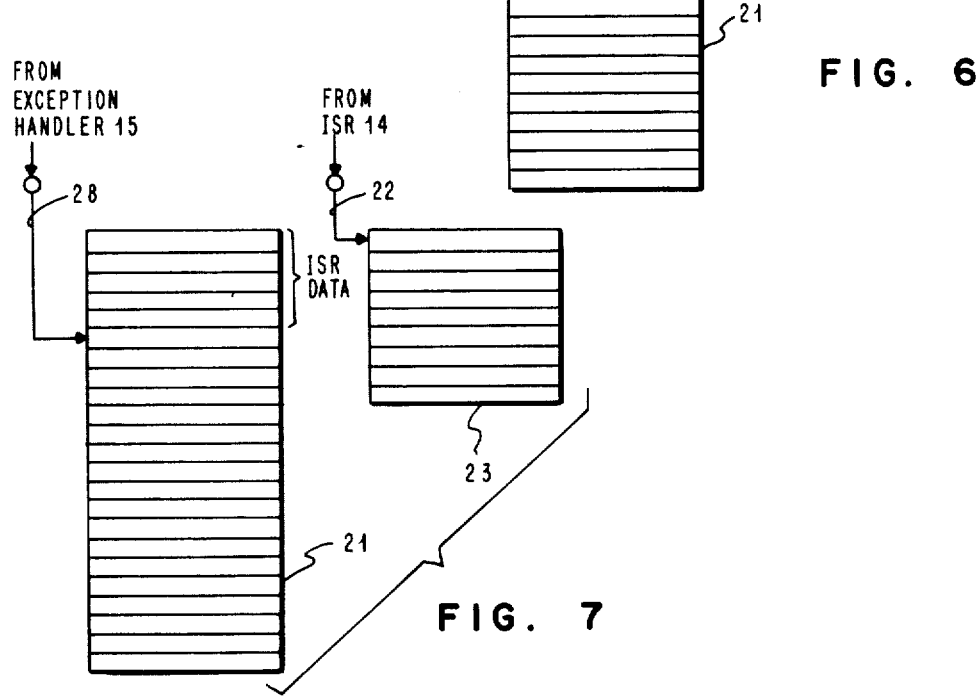
FIG. 5
FIG. 6
FIG. 7

000
SWITCHING OF PROGRAMMING ROUTINE SUPPORTING STORAGE STACKS

DESCRIPTION

1. Technical Field

The present invention relates to systems in which devices or machines are controlled by instructions from a data processor. It particularly relates to saving of storage space in the main processor memory while effectively fulfilling the requirements of an exception handler routine when conditions occur in the device or machine which make it impossible for the device or machine to fully carry out the processor instructions.

2. Background Art

In the data processing technology, it is often expedient to assign a storage stack to a particular data processing routine. The storage stack is a portion of the main memory of the processor which is in effect dedicated to the particular routine. The advantage of assigning such a stack to a particular routine is that it permits the routine to access the stored information in a much more rapid and less complex manner than would be the case if the particular routine were required to store the same data in general memory. Of course, the primary disadvantage of such dedicated stacks is that less memory is available for other functions, and consequently a larger processor memory may be required in order to carry out all the processor functions. While the quantity of memory dedicated to such stacks does not present a significant problem to large data processing systems which have substantial amounts of available memory, it does present a problem to small processors.

In the last decade, demand for and applications for small processors has been increasing at a very great rate. Small processors are being used extensively for various device and machine control functions wherein the processor controls an electronic, chemical or mechanical device. In the office system field, small processors are extensively used to control various data recording and printing machines and devices, e.g., printers or disk drives.

In the office system field, it is customary to have the processor which controls a device such as a printer interface with the printer through an interrupt service routine. Conventionally, the instructions from the processor are sent to the printer through this interrupt service routine which monitors the response of the printer to these commands from the processor. The interrupt service routine determines whether the response from the printer is indicative of error or exception conditions when the flow of commands from the processor to the printer must be interrupted until the exception or error condition is corrected. Because of the substantial involvement of the interrupt service routine in the interface between the processor and the printer, the routine requires a relatively large supporting stack in the processor memory so that it can quickly communicate the commands from the processor to the printer and the responses from the printer.

The office systems field is a highly competitive one in which expedients for decreasing processor main memory requirements are always being sought. Since additional memory is customarily added in units of 16K bytes, any expedient which can avoid a unit of additional memory will reduce the price of a system in the order of 30 to 130 dollars.

The stack switching expedient of the present invention involving the interrupt service routine stack substantially reduces memory requirements in small processors so that the requirements may be reduced by the above mentioned one unit of memory.

DISCLOSURE OF THE INVENTION

The present invention is directed to a system comprising a data processor which controls a device or machine through a series of instructions or commands from the data processor to the machine. The improvement of the present invention which is directed to stack switching involves the combination of apparatus for monitoring responses from the control device to the instructions of the data processor. The responses are monitored for exception conditions. The primary memory storage stack normally supports these monitoring means but a secondary memory storage stack with less capacity than the primary stack is also provided. Data processing apparatus further includes an exception handler routine activated by the monitoring means in response to an exception condition. Apparatus is further provided which in response to the activation of the exception handler routine switches the primary stack to support the exception handler routine and places the secondary stack in support of the monitoring means.

In a preferred embodiment of the present invention, the monitoring means is an interrupt service routine in the data processor and the control device is a printer. As will be hereinafter described in greater detail, during normal processor control printing operation, the interrupt service routine is extensively involved in the application of the processor commands to the printer and the monitoring of the responses of the printer to these commands. Consequently, interrupt service routine requires a supporting memory storage stack of considerable capacity as provided by the primary storage stack. On the other hand, when the interrupt service routine senses an exception condition in the printer and activates the exception handler routine, then, the interrupt service routine requires only minimal supporting stack capacity while the exception handler routine now requires an extensive supporting stack. As a result of the above described switching, the exception handler routine is now supported by the primary storage stack which has substantial capacity while the interrupt service routine has its minimal storage needs met by smaller capacity secondary storage stack.

In accordance with a more specific aspect of the present invention, the system further includes means for retaining in said primary storage stack material previously stored in support of the interrupt service routine after the switching of the primary storage stack. The exception handler routine includes means for determining the end of exception conditions and for switching the primary storage stack back to its original state in support of the interrupt service routine upon the end of exception condition.

BRIEF DESCRIPTION OF DRAWINGS

Referring now to the drawings, wherein a preferred embodiment of the invention is illustrated, and wherein like reference numerals are used throughout to designate like parts;

FIG. 5 is a diagrammatic representation of the primary and secondary stacks at the initiation of the interrupt service routine.

FIG. 6 is a diagrammatic representation of the primary and secondary stacks at a point where the interrupt service routine (ISR) is operating normally and the exception handler routine is not operational.

FIG. 7 is a diagrammatic representation of the primary and secondary stacks at the point when the exception handler routine has taken over the primary stack and the interrupt service routine (ISR) has been switched to the secondary stack.

BEST MODE FOR CARRYING OUT THE INVENTION

Figure 1:
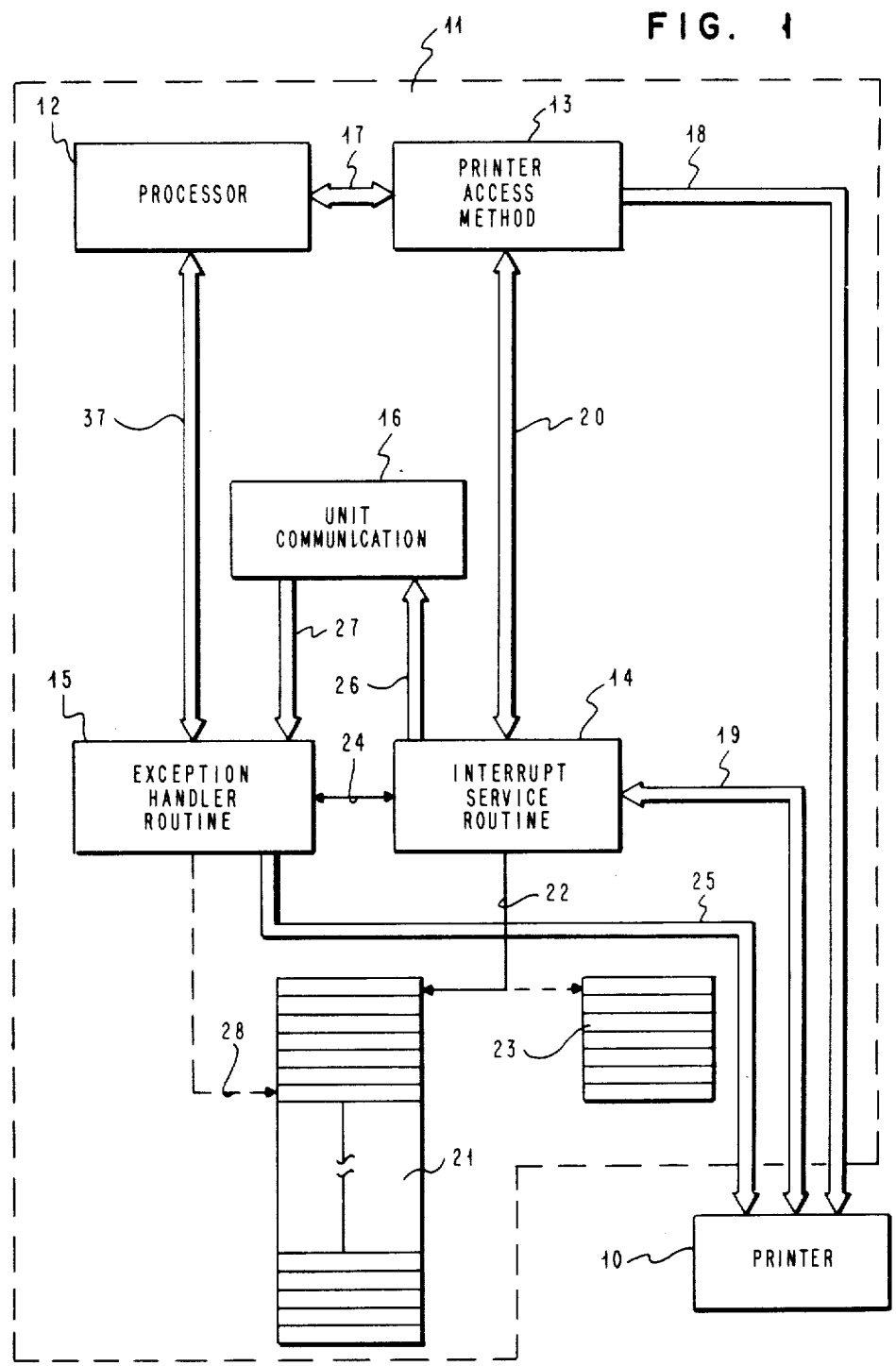
FIG. 1 is a logical block diagram showing the apparatus of the present invention in a generalized form.

With reference to FIG. 1, a generalized view of the apparatus which may be used to carry out the present invention is shown. Printer 10 operates under the control of a data processing system 11 (included within dashed line); the processing system outputs a series of commands or instructions to the printer 10 in response to which the printer will operate in a conventional manner to produce a desired printed document. The controlling processor is a small processor like the IBM Personal Computer or any conventional word or text processing system such as that described in co-pending application Ser. No. 274,050, filed June 16, 1981, D. G. Busch, "Data Communications System with Receiving Terminal for Varying the Portions of Received Data Being Displayed". Data processing system 11 includes an internal data processor 12 which controls various logical operations of the data processing system as well as the particular routines such as the printer access method 13, the interrupt service routine 14, the exception handler routine 15 and the unit communications block 16 which will hereinafter be described in greater detail. In conventional data processor controlled printing operations, commands to the printer 10 are sent from processor 12 through printer access method 13.

In initiating the printer operation, processor 12 sends the initiating commands to the printer access method 13 through channel 17. These commands are in turn applied to the printer through channel 18. When the printer is thus activated, it responds with a return over channel 19 to interrupt service routine 14 indicating that the printer is set up and ready to print. Interrupt service routine 14 then conveys this information through channel 20 to the printer access method 13 which advises the processor 12.

At this point, the commands from processor 12 will be sent through printer access method 13 and then through interrupt service routine 14 to provide the printer with print data which may be referred to as character vectors, i.e., the characters to be printed at a particular printer index and line positions. Because of this major function of the interrupt service routine as an interface for character vector data to the printer, the interrupt service routine requires a supporting primary memory storage stack 21 with relatively high capacity in order for the interrupt service routine to keep track of various index, line position, and tab information and other data relative to the status of printer 10. This primary memory storage stack 21 is provided in the main RAM memory of processor 11.

The interrupt service routine utilizes storage stack 21 primarily as a "scratch pad". In other words, the routine requires a readily and quickly accessible storage area where it can temporarily store the status of various registers in the interrupted printing process such as index and line position counters required to support the interrupt service routine in its application of processor commands to the printer. When a particular printing step is completed, information temporarily stored is erased or emptied from the stack.

The interrupt service routine 14 accesses stack 21 through pointer channel 22 which in effect moves up and down stack 21 as information is input and erased from stack 21. During routine printing operations after the interrupt service routine has provided the commands to printer 10, the printer responds to the interrupt service routine over channel 19 with an indication that the printer has received the command and is ready for the next command. At this point, the interrupt service routine will obtain the next command from processor 12 through printer access method 13 and apply the same to printer 10 over channel 19.

In any operation, the printer, from time to time will experience some abnormalities or problems. These may be due to various hardware conditions, e.g., the printer may be out of paper, the print wheel may be jammed, may be out of ribbon, the carriage may be stuck, or there may be software errors in the instructions so that the printer is unable to carry them out. In such a case, the printer will respond with an exception condition to interrupt service routine 14 which, in turn, will activate exception handler routine 15 through channel 24. When this occurs, as will be hereinafter described in greater detail, data processing system 11 goes into an exception handler condition wherein commands from the processor to the printer are interrupted, and the exception handler routine 15 issues a series of commands to printer 10 over channel 25. The printer responds via channel 19 through interrupt service routine which communicates these responses to the exception handler routine via channel 26 unit communication block 16 and channel 27.

During the diagnostics of these exception conditions, exception handler routine is in extensive communication with printer 10 and is conducting extensive diagnostics for potential hardware and software problems with respect to the printing operation. On the other hand, during such exception conditions, the interrupt service routine involvement is fairly limited. It does not send commands to the printer but merely forwards the printer responses to the exception handler routine.

When thus activated, the exception handler routine will require a fairly large supporting storage stack to serve as a "scratch pad" to keep track of various printer states required for its diagnostics. On the other hand, the interrupt service routine's requirements for supporting stack is fairly limited. Accordingly, when activated the exception handler routine will institute a switch in stacks as indicated by dotted pointer lines in FIG. 1, i.e., the exception handler routine will take over primary stack 21 and communicate with it over pointer channel 28 while the interrupt service routine's pointer channel 22 will be switched from large capacity primary storage stack 21 to a secondary storage stack 23 having a substantially lower capacity which is still sufficient to meet the storage needs of interrupt service routine 14 during the exception handler.

Upon the completion of the exception handler routine, the operations will be restored to the original condition wherein the interrupt service routine is again forwarding commands to the printer and switched back to primary supporting stack 21 via pointer channel 22.

Figure 2:
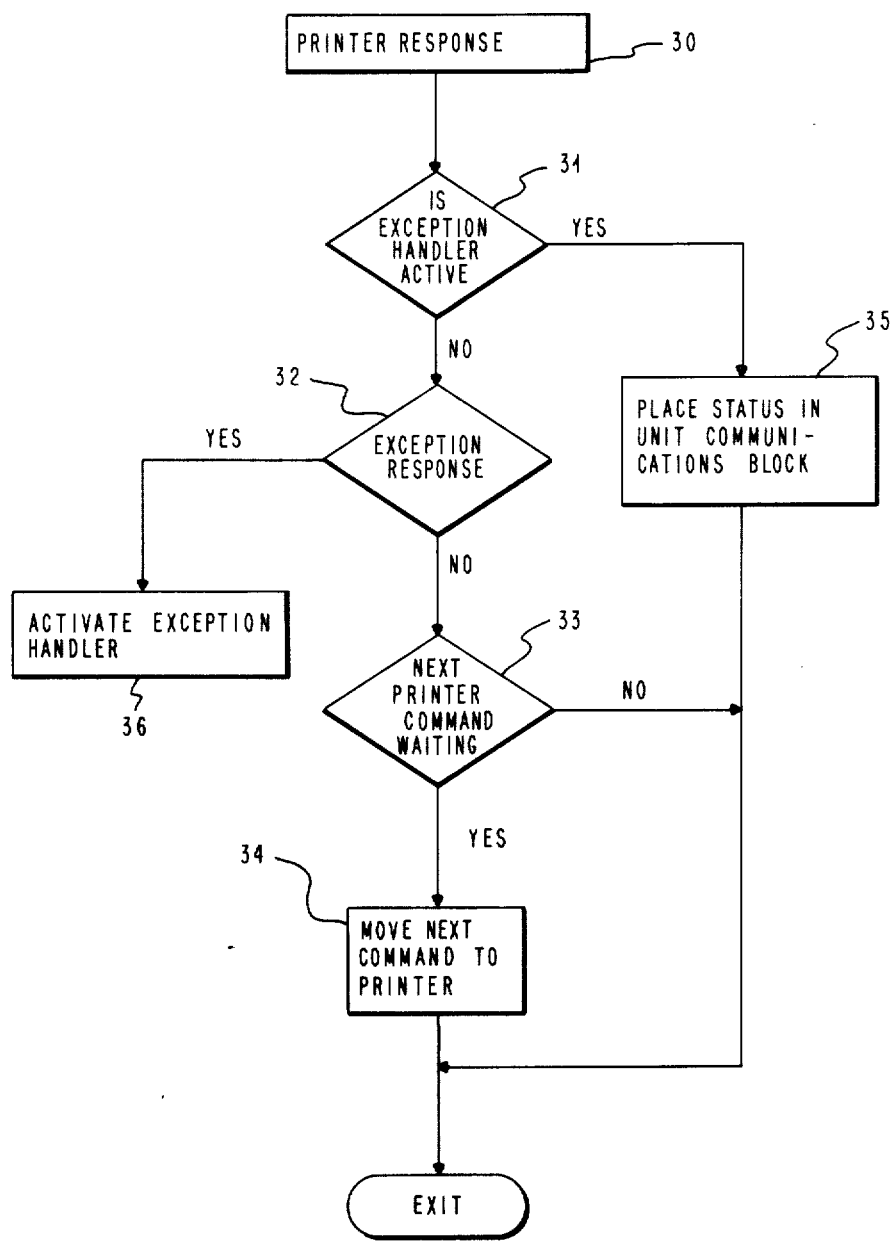
FIG. 2 is a flow chart of the operations involved in the interrupt service routine when the routine is passing the processor commands to the printer and monitoring the printer responses.
Figure 3:
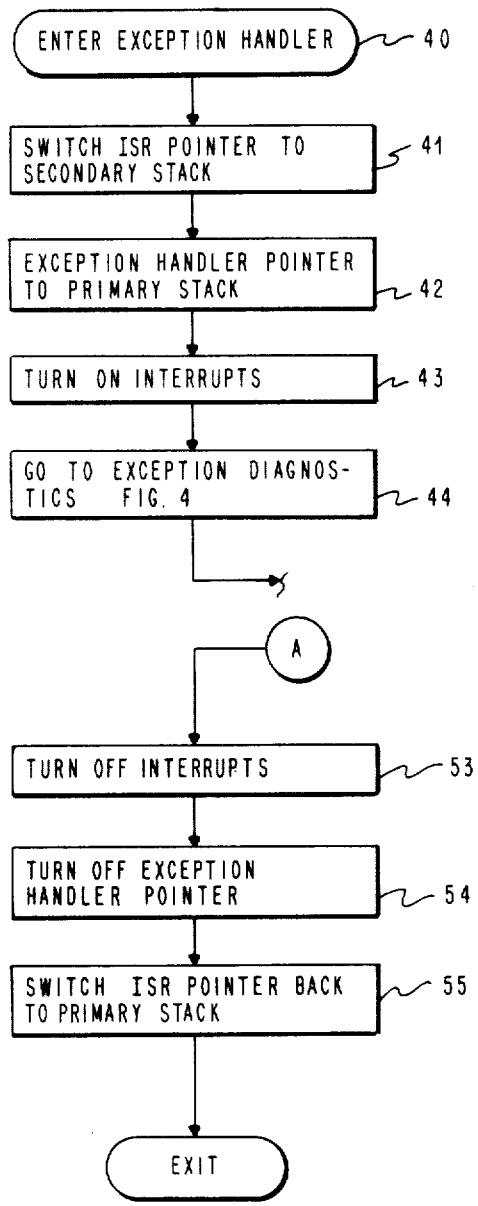
FIG. 3 is a flow chart of the operations involved in the exception handler routine.
Figure 4:
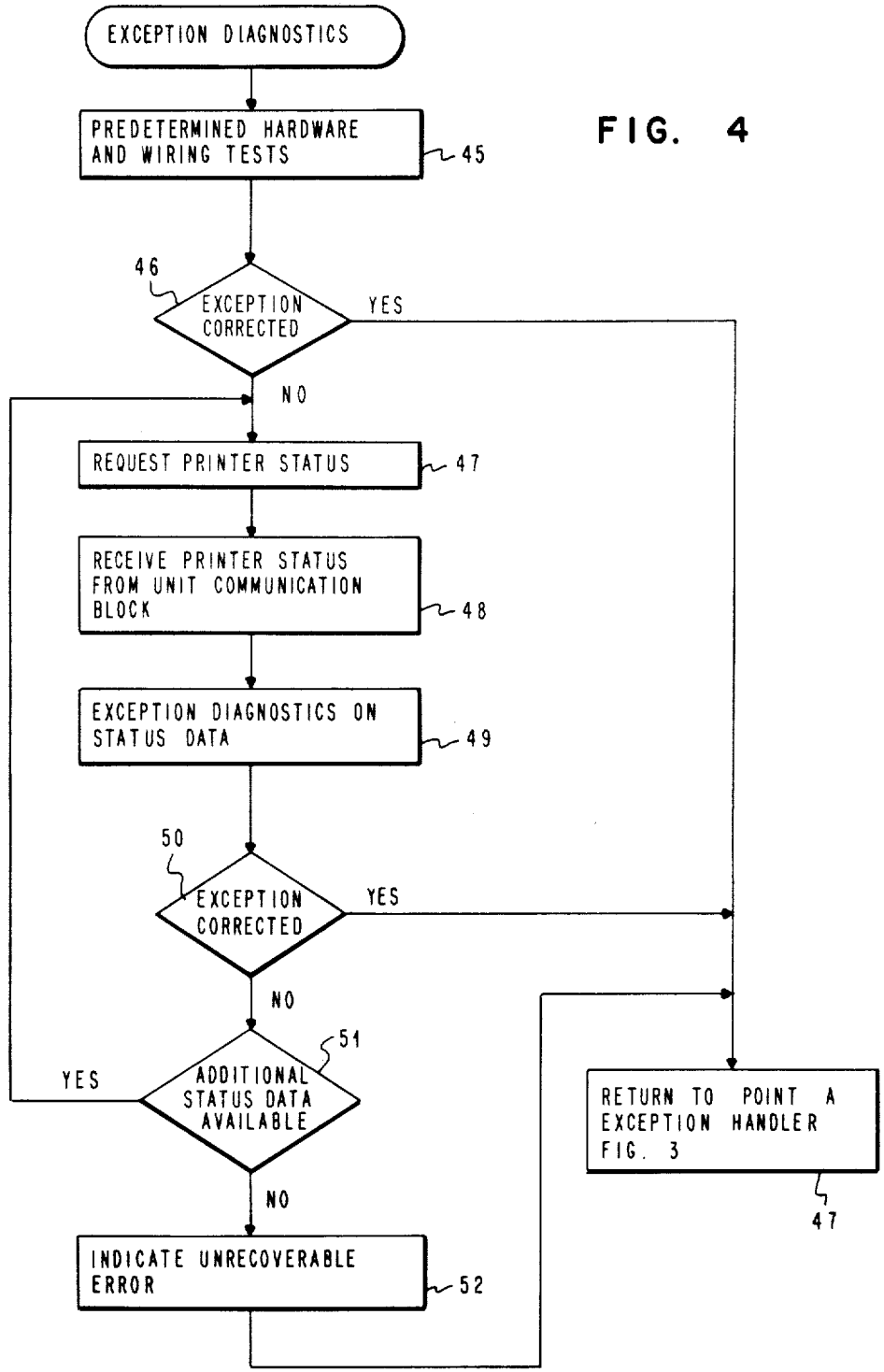
FIG. 4 is a flow chart of the operations involved in diagnostics of exception conditions by the exception handler routine.

With this background of the general operation of the system, let us now consider the steps in a specific operation with reference to the flow charts of FIGS. 2, 3 and 4. Let us assume a normal operating situation where the printing operation has already been initiated and the sequence of print command is being forwarded from processor 12 to printer 10 via printer access method 13 and interrupt service routine 14. The apparatus is in the original state shown in FIG. 1. With reference to FIG. 2, a printer response is sent to interrupt service routine 14 over channel 19, step 30. The interrupt service routine then makes a determination, step 31, as to whether the exception handler 15 is active. If the exception handler is not active, then, decision step 32, interrupt service routine (ISR) 14 determines if the response from the printer indicates any exception condition. If there is no exception condition, ISR 14 determines, decision step 33, whether the next command to the printer is available in printer access method 13. If it is available, step 34, it proceeds to move this next command to the printer over channel 19 and exits to await the next printer response which will reactivate this routine.

It should be noted with respect to this procedure that if in decision step 31, the determination was made that the exception handler routine was active, whatever status data was obtained in the response is to be communicated to the exception handler routine. This is done by, step 35, placing this status communication in unit communication block 16 (FIG. 1) which is part of an internal communications system within processor 11. The exception handler may then obtain this status information from unit communication block 16 via channel 27. This will hereinafter be described in greater detail during the description of the operation of the exception handler routine in FIG. 3. In any event, if in decision step 32, FIG. 2, the interrupt service routine receives an exception response from the printer indicating an exception condition, it activates the exception handler routine 15, step 36.

Let us now consider what occurs when the exception handler routine is activated and enters the operation, step 40, FIG. 3. The exception handler routine immediately initiates the switch in stacks, through step 41, switching ISR pointer channel 22 to secondary storage stack 23 and step 42 activating channel pointer 28 (FIG. 1) from exception handler routine 15 to primary storage stack 21. The exception handler routine then, step 43, turns on the printer interrupts by communicating with processor 12 over channel 37 whereby processor 12 interrupts the printing operation. The routine then proceeds, step 44, to the exception diagnostics shown in the flow chart of FIG. 4.

First, step 45, the printer is put through a series of predetermined hardware and wiring tests, i.e., test to determine whether some of the hardware elements such as the carrier or the printwheel or the indexing mechanism are not functioning properly. These tests will not be specifically described since there a great many tests which could be made to determine these conditions. Some may be conducted under the control of the exception handlers and some outside of the exception handler routine control. In any event, the nature of these tests are not pertinent to the present invention which is primarily directed to the relationship of the supporting stacks to the functioning routines. After the various hardware and wiring tests have been completed, a determination is made, decision step 46, as to whether the exception condition has been corrected through these hardware expedients. If the exception condition has been corrected, then, step 47, the operations are returned to point A of the exception handler routine in FIG. 3. On the other hand, if the exception condition has not been corrected, then, printer status is requested, step 47, by the exception handler routine 15 (FIG. 1) over channel 25 to printer 10. Then, step 48, FIG. 4, the printer status is obtained by the exception handler routine 15 (FIG. 1) from unit communication block 16. As indicated hereinabove, during exception handler conditions, the interrupt service routine 14 places responses that it receives from printer 10 into unit communications block 16 so that they can be forwarded to exception handler routine 15. The routine then proceeds with its diagnostics, step 49, FIG. 4 on the status data which it received. Here again, the exception diagnostics may be any conventional diagnostics performed on printer data in order to determine error or exception conditions. If the exception has been corrected, decision step 50, then, the operations are returned to point A in exception handler routine flow chart of FIG. 3. On the other hand, if the exception has not been corrected, then, if additional status data is still available, step 51, this status data is obtained step 47, and steps 47 through 50 are repeated until additional status data is no longer available. In this case, the processor will indicate to the operator, step 52, that there is an unrecoverable error condition. In any event, at this point let us assume that a determination has been made in the exception diagnostics of FIG. 4 that the exception has been corrected and, step 47, the operations are returned to point A in the flow chart of FIG. 3.

The interrupts will be turned off, step 53, by exception handler 15 (FIG. 1) advising the processor 12 over channel 37 to turn off interrupts and resume the normal flow of print commands. In addition, step 54, FIG. 3, exception handler routine will release primary stack 21 by turning off pointer channel 28. Also, step 55, FIG. 3, the ISR pointer channel 22 will be switched back to primary stack 21 to restore the condition shown in FIG. 1 where stack 21 now supports interrupt service routine 14 and the exception handler routine shown in FIG. 3 will exit to permit resumption of the previously described routine printing operation wherein commands from processor 12 are sent to printer 10 via printer access method 13 and interrupt service routine 14.

FIGS. 5-9 are illustrations to show the condition with respect to primary stack 21 and secondary stack 23 during the various stages of operations described in flow charts 2-4. FIG. 5 shows the condition of primary stack 21 and secondary stack 23 at the commencement of a printing operation. It is essentially the condition shown in FIG. 1 wherein pointer channel 22 from ISR 14 is connected to primary stack 21 and is at an initial position in that stack indicating that there is no data for supporting ISR 14 in stack 21. FIG. 6 shows the state of the apparatus after the normal printing operation has been in effect for a period of time. Under normal conditions, primary stack 21 is still being accessed by ISR 14 via pointer channel 22. However, pointer channel 22 has moved down the stack for a number of positions indicating that data supporting ISR 14 is stored in the upper portion of primary stack 21. At this point, exception handler routine 15 is still inactive. FIG. 7 shows the condition of the apparatus upon the activation of exception handler routine 15. Pointer channel 28 from exception handler routine 15 has been connected to primary stack 21 while pointer channel 22 from ISR 14 has been switched to secondary stack 23 and is at the initial point in that stack. It should be noted that pointer channel 28 is connected part way down the stack to thereby preserve the previously stored ISR data as indicated.

Figure 8:
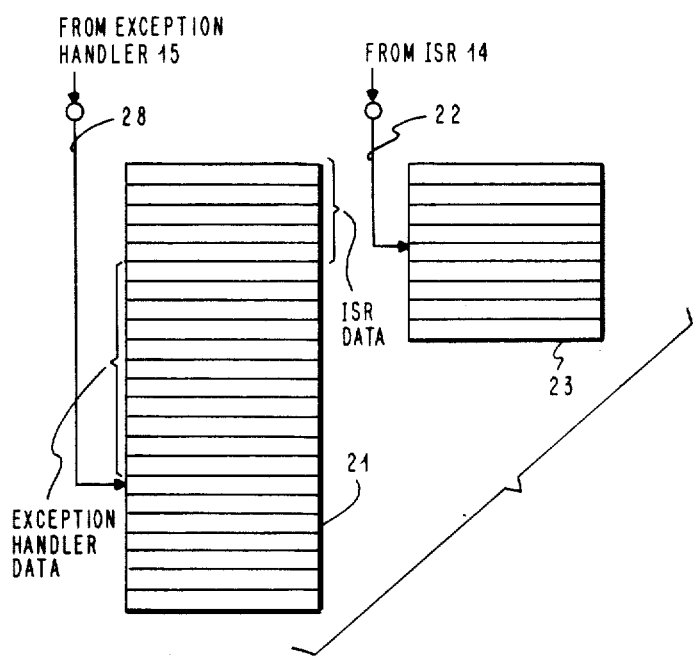
FIG. 8 is a diagrammatic representation of the primary and secondary stacks at a point when the exception handler routine has been operational for a period of time and the primary stack has been utilized to store data in support of the exception handler routine while the secondary stack has been utilized to store further data in support of the ISR.
Figure 9:
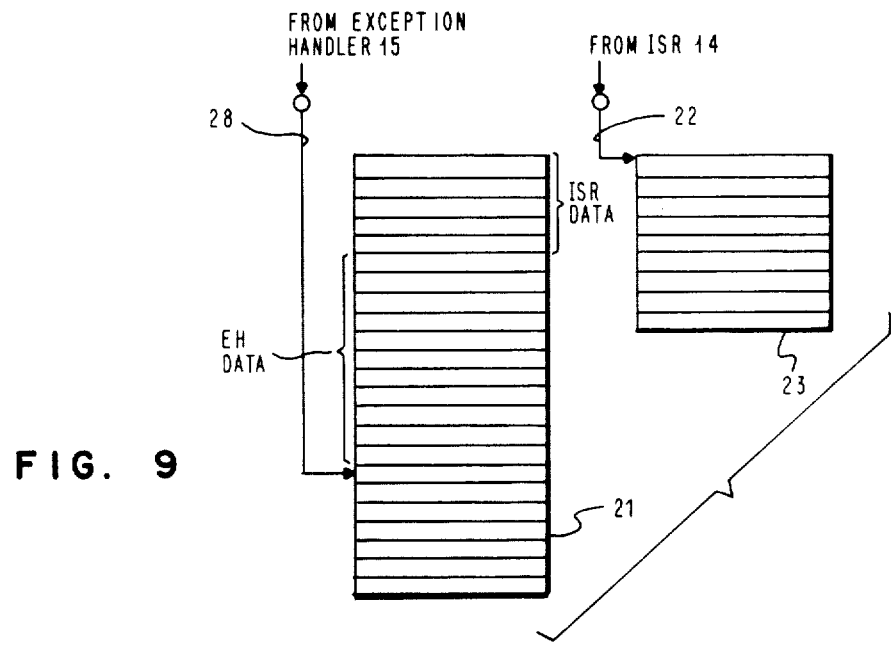
FIG. 9 is a diagrammatic representation of the primary and secondary stacks at a point where the exception handler routine has been supported by the primary stack for a period of time and has data loaded therein while the ISR has utilized the data it stored in the secondary stack and is back at the beginning of said secondary stack.

The apparatus of FIG. 8 is shown at a stage when the exception handler routine has been operational for awhile and pointer channel 28 has moved down primary stack 21, and the exception handler routine data indicated stored in the stack beneath the previously stored ISR data. In addition, pointer channel 22 from ISR 14 has moved down secondary stack 23 to indicated some temporarily stored ISR data in secondary stack 23. FIG. 9 shows the same apparatus at a further advanced stage. The exception handler routine 15 is still operational, thus, ISR 14 is still supported by secondary stack 23 via pointer channel 22. Whatever limited data ISR 14 had temporarily stored in secondary stack 23 has been erased, and pointer channel 22 is back at its initial entry into secondary stack 23.

Upon the completion of the exception handler routine, the routine will restore the apparatus to the condition shown in FIG. 6 wherein pointer channel 28 has been removed from primary stack 21 and primary stack 21 has been restored to support ISR 14 via pointer channel 22. The ISR data previously stored in primary stack 21 has been preserved through the exception handler routine during the exception handler routine operation and is still in the stack when the stack is returned to the support of ISR 14.

While the invention has been particularly shown and described with reference to a preferred embodiment it will be understood by those skilled in the art that various other changes in form and detail may be made without departing from the spirit and scope of the invention.

We claim:

1. In a system comprising a device controlled by instructions from a data processor and a main memory, the improvement comprising means for monitoring responses from said device to said instructions for the occurrence of exception conditions, a primary storage stack in the system main memory normally accessed by said monitoring means, a secondary memory storage stack having less capacity than said primary stack, an exception handler routine activated by said monitoring means in response to the occurrence of exception conditions, and means responsive to said activation of said exception handler routine to switch said primary stack to be accessed by said exception handler routine and to place said secondary stack to be accessed by said monitoring means.

2. The system of claim 1 wherein said monitoring means is an interrupt service routine in said data processor, and said controlled device is a printer.

3. The system of claim 2 further including means for retaining in said primary stack data to be used by said interrupt service routine, after the switching of said stack.

4. The system of claim 2 wherein said interrupt service routine includes means for applying responses from said printer to said exception handler routine when said exception handler routine is activated.

5. The system of claim 4 wherein said exception handler routine includes means for determining the end of said occurrence of exception conditions and means for switching said primary stack to be accessed by said monitoring means upon said end of exception conditions.

6. In a method of controlling a device by instructions from a data processor, the improvement comprising the steps of monitoring responses to said instructions from said device for the occurrence of exception conditions, designating a primary storage stack in main memory to normally be accessed by said monitoring steps, making a secondary memory storage stack of less capacity than said primary stack available for access by said monitoring steps, making available an exception handler routine activatable in response to a monitored exception condition occurrence, and switching said primary stack to be accessed by said exception handler routine and making said secondary stack to be accessed by said monitoring steps in response to the activation of said exception handler routine.

7. The method of claim 6 wherein said monitoring steps are carried out by an interrupt service routine in said data processor, and said controlled device is a printer.

8. The method of claim 7 further including the step of retaining in said primary stack data to be used by said interrupt service routine after the switching of said stack.

9. The method of claim 7 wherein said interrupt service routine includes the step of applying responses from said printer to said exception handler routine when said exception handler routine is activated.

10. The method of claim 9 wherein said exception handler routine determines the end of the occurrence of said exception conditions and switches said primary stack to be accessed by said monitoring steps upon said end of exception conditions.

* * * * *